June 25, 1963    E. F. SCHELISCH    3,095,565
ANTI-JAMMING PULSED-RADAR CIRCUIT
Filed Dec. 16, 1959
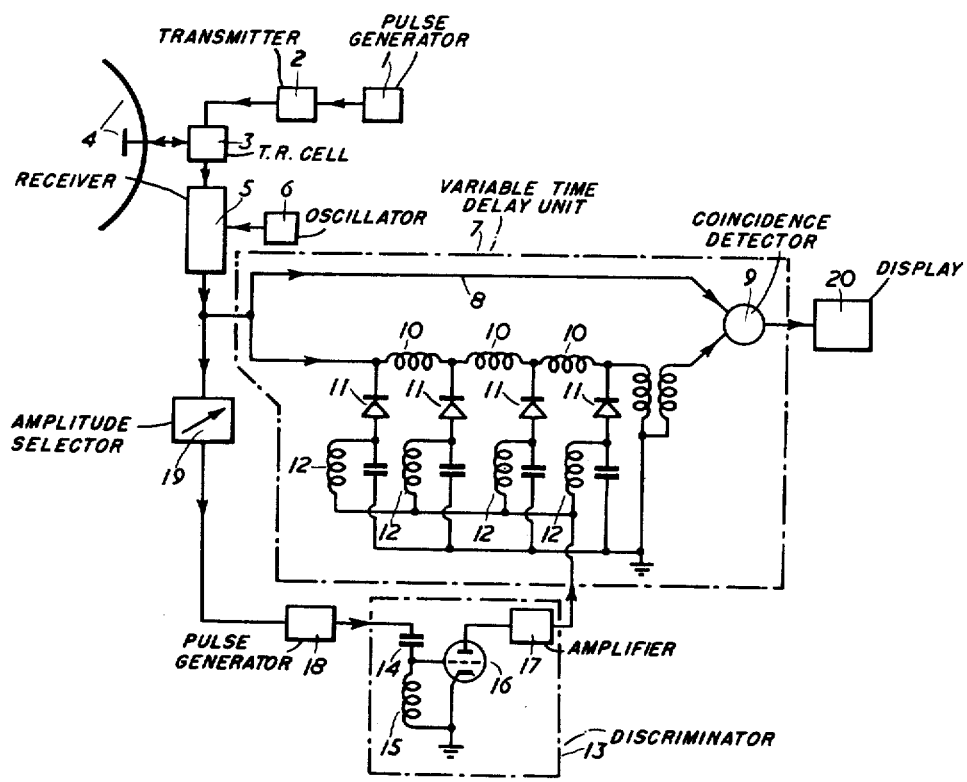
INVENTOR.
Ernst Friedrich Schelisch
BY
Baldwin & Wight
ATTORNEYS 3,095,565
ANTI-JAMMING PULSED-RADAR CIRCUIT
Ernst Friedrich Schelisch, Great Baddow, England, assignor to Marconi's Wireless Telegraph Company Limited, London, England, a company of Great Britain
Filed Dec. 16, 1959, Ser. No. 859,954
Claims priority, application Great Britain June 4, 1959
6 Claims. (Cl. 343—17.1)

This invention relates to pulsed radar systems and has for its object to provide improved and relatively simple means for eliminating or reducing interference—in particular interference by what may be termed "follow up" jamming, though, as will be seen later, the invention also reduces certain form of accidental interference which is fairly frequently experienced.

A form of pulsed radar jammer which can be very troublesome is that in which the jammer receives the transmitted pulses and automatically follows the radar pulse repetition frequency in an endeavour to produce and transmit powerful jamming pulses at the same repetition frequency. If the pulse radar system is of fixed pulse repetition frequency, as, of course, is the normal case with non-military radars and is often the case with military radars also, such a jamming equipment will, after the reception of a comparatively small number of radar pulses, adjust itself substantially exactly to the pulse repetition frequency and produce the most serious jamming. For this reason it has been proposed in military radars to obtain a degree of immunity from follow-up jammers by using a random varying pulse repetition frequency, the radar pulse repetition frequency varying more or less rapidly in random fashion. However, some jamming equipments which have been developed are capable of following the pulse repetition frequency of even those radars which are of random pulse repetition frequency, sufficiently quickly and closely to produce serious interference although, of course, in such cases the follow-up jammer necessarily lags by a material extent behind the random pulse frequency radar in adjusting itself to the random frequency so that the jammer is never exactly "in step" with the radar as regards pulses repetition frequency.

Accidental interference also often occurs with the operation of radars of nominally constant pulse repetition frequency in cases where there are other radars of the same nominal pulse repetition frequency in the vicinity. A common example of this is in harbour radar control and surveillance systems where there may be several ship-borne radars fairly close to one another, operating on the same nominal pulse repetition frequency. Although, in such cases, the pulse repetition frequencies of the different ship radars, though nominally the same, will in practice not be exactly the same but will be different from one ship to another, they are near enough together to make interference common and sometimes serious.

The present invention seeks to provide pulsed radars with simple means for eliminating or greatly reducing interference occurring as above described. The main application of the invention is to the reduction of interference by "follow up" jammers with varying pulse repetition frequency radars but it can also be used with advantage to reduce accidental interference, arising as above described, with constant pulse repetition frequency radars.

According to this invention a pulsed radar system includes in the receiver portion thereof, two signal paths having their input ends fed in parallel with signals derived from the radar receiver, a variable delay line in one of said paths, means for combining the outputs of said paths in opposition, display means fed with signals derived from the combined output of said paths, means for separating from the received signals, signals exceeding a predetermined amplitude, and means dependent on the frequency of the separated signals, for varying the delay of said delay line.

Preferably the received signals from which the separated signals are separated and the received signals fed to the two paths are intermediate frequency signals.

Preferably also means are provided for adjusting the value of the predetermined amplitude which the separated signals are to exceed.

The means for varying the delay of the delay line may include a pulse source adapted and arranged to produce a pulse in response to each separated signal, and a frequency sensitive control unit fed with said pulses and adapted and arranged to produce a control signal dependent on the frequency of the pulses fed thereto and to supply said control signal to said delay line to control the delay thereof.

The delay line may conveniently include variable capacities in the form of Zener diodes variable by bias applied thereto.

The invention is illustrated in the accompanying drawing which shows in block diagram form, and so far as is necessary to an understanding of the present invention, one form of radar system embodying the said invention.

Referring to the drawing, 1 is a pulse generator of continuously variable frequency which controls a transmitter 2 to cause it to produce pulses at a random varying pulse repetition frequency in any convenient manner known per se. This type of generator is disclosed, for example, in "Radar Engineering" by Donald G. Fink, published 1947 by McGraw-Hill, and specifically on pages 435–439, and details of construction of spark gaps and associated circuits are given in chapter 9 of this text. These pulses are fed through a transmit-receive (T.R.) cell 3 to the customary transmitting and receiving aerial system 4.

Received echo pulses are fed through the T.R. cell 3 to a receiver 5 which is of the usual superheterodyne type and with which is associated a local oscillator 6. The output of the receiver is an intermediate frequency output and is fed to a unit provided in accordance with this invention and which is within the chain line block 7.

At the input to the unit 7 the intermediate frequency output from the receiver 5 divides into two signal paths, one of which is a simple direct path 8 to a coincidence detector 9 of any form known per se and adapted to produce zero output if it simultaneously receives two signals, one at each of its two inputs.

The second signal path from the output of the receiver to the coincidence detector 9 is through a delay line of controllable time delay. As shown this delay line includes series inductances 10 and shunt capacities constituted by Zener diodes 11. As is known a Zener diode is a diode which will manifest a capacity which can be varied by varying the bias on it. This characteristic is described in a book entitled "Principles of Transistor Circuits" by R. F. Shea, published 1953 by John Wiley. On page 10 of this book, Fig. 1.8 discloses a capacitance-voltage relationship for alloy-diffusion junctions and shows that the capacitance C varies linearly and inversely with the barrier potential. These characteristics are plotted for typical p-n junctions which, as illustrated on page 12 of this text, inherently have Zener breakdown characteristics.

Capacity controlling bias is supplied to the Zener diodes 11 through chokes 12 from a frequency sensitive control unit, or discriminator within the chain line block 13. This control unit may be of any suitable kind known per se adapted to give a control signal output representative of and dependent on the frequency of the input thereto. In the drawing, it is indicated as being of a very simple form comprising a series resonant circuit 14—15 with the grid-cathode circuit of a valve 16 across the inductance thereof, the output from the valve 16 being amplified by a suitable amplifier 17 for supply through the chokes 12.

The unit 13 receives input from a pulse generator 18 which is controlled, e.g. triggered, by output pulses from an amplitude selector circuit 19 fed with intermediate frequency output from the receiver 5. It will be appreciated that jamming pulses will generally be a good deal more powerful than the required echo pulses and the amplitude selector is so set as to pass only pulses of an amplitude exceeding a predetermined value chosen to be such that required echo pulses will not pass the selector 19 but jamming pulses will. Preferably the level of amplitude selection of the selector 19 is adjustable. This is conventionally indicated in the drawing by an arrow on the selector 19.

Each of the jamming pulses passed by the unit 19 produces a pulse from the pulse generator 18 and the tuning of the circuit 14—15 is so chosen that any frequency to be expected in practice will lie somewhere on the resonance response curve of the circuit 14—15 to one and the same side of the resonance point thereof. The output from the unit 13 will, therefore, be a control signal dependent on the frequency of the jamming pulses. This control signal is applied to control the delay of the delay line in the unit 7 in such manner as to produce cancellation of jamming pulses in the unit 7 due to the delay being automatically adjusted at a value such that successive jamming pulses mutually cancel in the coincidence detector or opposition combiner 9. Output from the device 9 is fed to utilisation and display means which may be of any sort known per se and are represented merely by the block 20. This output will consist almost entirely of the desired echoes which will not be cancelled out by the equipment shown because, in practice, the jamming pulses (to which the delay line in the unit 7 is automatically adjusted) will not be of exactly the same repetition frequency as the echo signals.

I claim:

1. A pulsed radar system including in the receiver portion thereof, two signal paths having their input ends fed in parallel with signals derived from the radar receiver, a variable delay line in one of said paths, means for combining the outputs of said paths in opposition, display means fed with signals derived from the combined output of said paths, means for selecting and separating from the received signals only those signals having an amplitude exceeding a predetermined value, and means dependent on the frequency of said selected and separated signals, for varying the delay of said delay line.

2. A system as claimed in claim 1 wherein means are provided for adjusting the value of the predetermined amplitude which the separated signals are to exceed.

3. A system as claimed in claim 1 wherein the means for varying the delay of the delay line include a pulse source adapted and arranged to produce a pulse in response to each separated signal, and a discriminator coupled between said pulse source and said delay line and fed with said pulses to produce a control signal dependent on the frequency of the pulses fed thereto and to supply said control signal to said delay line to control the delay thereof.

4. A system as claimed in claim 1 wherein the delay line includes variable capacities in the form of Zener diodes variable by bias applied thereto.

5. A system as claimed in claim 1 including transmitter means and means for varying the transmitted pulse repetition frequency of said transmitter means.

6. A system as claimed in claim 1 including a local frequency oscillator and heterodyning means coupled to said oscillator wherein the received signals are heterodyned with the output from the said local frequency oscillator, the said separated signals being separated from the output of the heterodyning means.

References Cited in the file of this patent

UNITED STATES PATENTS 2,765,446     Martin                   Oct. 2, 1956